Patented Apr. 25, 1950

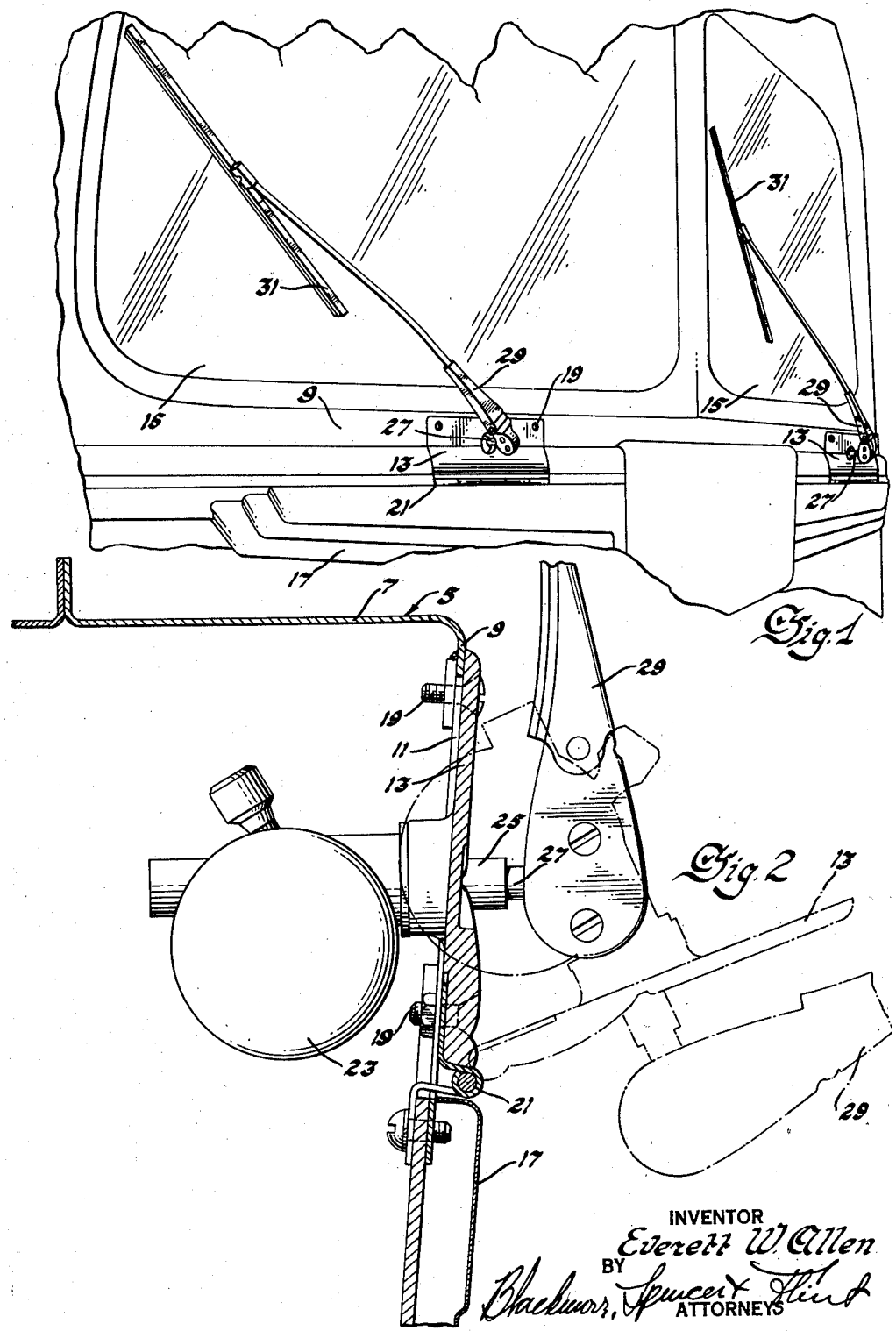

2,505,078

UNITED STATES PATENT OFFICE 2,505,078

WINDSHIELD WIPER

Everett W. Allen, Birmingham, Mich., assignor to General Motors Corporation, Detroit, Mich., a corporation of Delaware Application September 18, 1944, Serial No. 554,575

3 Claims. (Cl. 15—255)

1

The installation of windshield wipers is frequently such that access for repair or replacement of the operating motor is quite difficult. This invention aims to provide very convenient access from the outside of the vehicle.

The invention is intended more particularly for large vehicles and is shown as applied to one of the so-called "Greyhound" busses.

In the drawing:

Fig. 1 is a view in perspective looking at the front end.

Fig. 2 is a vertical section showing the wiper mounting in two positions.

Referring by reference characters to the figures of the drawing, numeral 5 is a metal sheet forming a part of the body. It has a horizontal shelf 7 from which depends vertically a part 9. An opening 11 is formed in the vertical part 9. The opening is slightly below the junction of parts 7 and 9 and is to be covered by a plate 13. The windshield is marked 15 and extends upwardly above the horizontal part 7. Below the part 9 there is shown a conventional ornamental trim member 17.

The plate 13 may be bodily removable and held in position on part 9 by screws or other fastening means 19 or, as shown in the drawing, it may be hinged as at 21 along one edge, preferably the lower edge, screws 19 being used to retain the plate in a position covering the opening 11. To the inner face of plate 13 is secured in any conventional manner a motor 23 for operating a windshield wiper. The motor shown is intended to be illustrative of those of the well-known vacuum type although electric or other kinds of motors may be mounted on the inner side of the plate if preferred. On the front side of the plate 13 is a boss 25 through which projects from the motor a shaft 27 adapted to be oscillated in the manner well-known in the art. The shaft 27 carries the usual arm 29 which latter carries the blade 31 which sweeps over the glass to remove water and foreign matter. Access to the motor is had by removing the two screws 19 and swinging the plate 13 on its hinge 21 as shown by dotted lines in Fig. 2. If the plate is made wholly removable as suggested above access to the motor is also convenient. By the term "movably" in the claims it is intended to cover the bodily movable as well as the hinged embodiment.

It will be seen that for a vehicle having a surface beneath the windshield adapted to the use of such a plate as 13 a very convenient arrangement has been provided for assembly of the motor and for its repair.

2

The drawing shows two windshield glasses each with its own wiper blade and arm and shaft. It will be obvious that each of the two plates shown will be provided with a motor. It is within the inventive idea, of course, to use but one motor and wiper or to use a second arm mechanically connected to the first instead of being operated by a second motor.

I claim:

1. In a vehicle of the type having a body with a front wall and a windshield above said wall, said wall and windshield extending transversely of said vehicle, an opening in said front wall adjacent said windshield, a plate movably mounted over said opening in said front wall and adjacent the windshield, a motor mounted on the inner face of said plate whereby it is concealed within said body when the plate is assembled over said opening, a rockshaft driven by said motor and extending through said plate, a windshield wiper arm attached to the outer end of said rockshaft adjacent the front face of said plate whereby both motor and windshield wiper mechanism are accessible from a position in front of said body wall and windshield.

2. In a vehicle of the type having a body with an exterior wall and a window adjacent said wall, said wall and window extending substantially transversely of said vehicle, an opening in said wall adjacent said window, a plate movably mounted over said opening in said wall and adjacent the window, a motor mounted on the inner face of said plate whereby it is concealed within said body when the plate is assembled over said opening, a rockshaft driven by said motor and extending through said plate, a window wiper arm attached to the outer end of said rockshaft adjacent the exterior face of said plate whereby both motor and window wiper mechanism are accessible from a position exterior to said body wall and window.

3. The invention defined by claim 2, said motor carrying plate being hinged to the body part whereby it may be swung to a position wherein the motor is rendered accessible.

EVERETT W. ALLEN.

REFERENCES CITED

The following references are of record in the file of this patent:

UNITED STATES PATENTS

| Number | Name | Date |
|---|---|---|
| 2,129,542 | Wernert et al. | Sept. 6, 1938 |
| 2,146,214 | Horton | Feb. 7, 1939 |